3,773,816
PRODUCTION OF ALKALI METAL ALUMINUM ALKOXIDES

Rudiger Honigschmid-Grossich, Ranzel, Arnold Lenz, Cologne-Stammheim, Otto Bleh, Bergheim, and Wolfgang Sandau, Wesseling, Germany, assignors to Dynamit Nobel AG, Troisdorf, Germany
No Drawing. Filed Oct. 7, 1971, Ser. No. 187,497
Claims priority, application Germany, Oct. 8, 1970,
P 20 49 400.2
Int. Cl. C08f 5/06
U.S. Cl. 260—448 AD          13 Claims

ABSTRACT OF THE DISCLOSURE

The process for producing an alkali metal aluminum alkoxide of the formula $MAl(OR)_4$ wherein M is an alkali metal and R is selected from the group consisting of alkyl containing in excess of three carbon atoms, cycloalkyl and aralkyl, which comprises boiling a member selected from the group consisting of an excess of an alcohol of the formula ROH and a mixture of at least one organic solvent indifferent in relation to the other reactants and an excess of an alcohol of the formula ROH with a member selected from the group consisting of (a) a mixture of an alkali metal hydroxide and aluminum trihydroxide, (b) a mixture of an alkali metal alkoxide and aluminum trihydroxide and (c) an alkali metal aluminate, and removing water formed in the reaction. The water is preferably distilled off from the reaction with excess alcohol, condensed, the water removed from the condensate by lime, silica gel or a zeolite, and the water-free alcohol is recycled to the reaction until the water content in the alcohol distilling off falls to a very low level. Advantageously the aluminum is used in slight excess to ensure the product is free of excess alkali metal alkoxide.

---

It is known to make alkali metal aluminum alkoxides of the formula $MAl(OR)_4$ by dissolving aluminum metal in a solution of the corresponding alkali metal alkoxides MOR in the alcohol ROH, or by jointly dissolving the equivalent amounts of alkali metal and aluminum in excess alcohol. It is also possible to produce alkali metal aluminum alkoxides by combining an alkali metal alkoxide and aluminum alkoxide or by reacting the appropriate amounts of alkali metal alkoxide with aluminum halide; cf., for instance, Liebigs Ann., 476, p. 113 et seq., Methoden der Organischen Chemie, Houben-Weyl, vol. VI/2, p. 30 et seq. (Methods of Organic Chemistry); and William L. Jolly, Preparative Inorganic Reactions, vol. 2, Metal Alkoxides, p. 169 et seq.

All of these methods are however burdened with the drawback that as starting material the aluminum has to be used in the relatively expensive form of either the metal or aluminum halide.

It is accordingly an object of the present invention to provide a process for making alkali metal aluminum alkoxides of the formula $MAl(OR)_4$ wherein R and M have their above-identified meanings which can be effected with an inexpensive source of aluminum such as the hydroxide.

This is realized in accordance with the present invention pursuant to which an excess of an alcohol containing in excess of three carbon atoms is boiled with a member selected from the group consisting of (a) a mixture of an alkali metal hydroxide and aluminum trihydroxide, (b) a mixture of an alkali metal alkoxide and aluminum trihydroxide and (c) an alkali metal aluminate, and the water formed in the reaction is removed. The water can be distilled off with the excess alcohol, and is cooled to form an alcohol-water condensate which, after removal of water, is preferably recycled to the reaction.

The initial reaction mixture also may contain one or more organic solvents indifferent in relation to the other reactants. Suitable solvents are hydrocarbons, e.g. benzene, xylene or toluene, and halogenated hydrocarbons.

Another form for removing the water is, to boil the alcohol under reflux conditions and to absorb the water either from the vapor phase or from the runback by means of water absorbing agents, e.g., zeolite, molecular sieve, silicagel and burnt lime.

If an organic solvent is present in the reaction mixture and this solvent is part of an azeotropic ternary system, containing water and the alcohol used in the reaction of this invention, then the water can be removed by azeotropic distillation.

As alcohols employed in the reaction there may be used any alcohol having a boiling point higher than water, e.g. containing in excess of three carbon atoms. Advantageously the alcohol is an alkanol, cycloalkanol or aralkanol which is volatile and preferably has from 4 to 7 carbon atoms, e.g. n- or isobutanol, n-amyl alcohol, n-hexanol, cyclohexanol, benzyl alcohol, or the like.

The highest yields are obtained using the hydroxides as such or after melting together with the aluminum compound to form $MAlO_2 \cdot 2H_2O$. Alkali metal aluminates with $<2H_2O$ also form the complex alkoxides but the yields are lower. The alkali metal aluminates may also be utilized as concentrated aqueous solutions.

According to the invention there can also be used mixtures of alkali metal hydroxide and alkalimetal alkoxide, mixtures of alkalimetal hydroxides and alkalimetal aluminate and mixtures of alkali metal alkoxide and alkali metal aluminate instead of the single alkali metal containing substances.

Alkali metal hydroxide and aluminum trihydroxide may be added to the alcohol either simultaneously or successively; in the latter case either the alkali metal hydroxide is first dissolved in the alchol and then the aluminum trihydroxide is added or alkali metal alkoxide is first prepared by distilling off the reaction water from the alkali metal hydroxide and thereupon aluminum trihydroxide is added. The alkali metal component may of course also be introduced at the outset of the reaction as alkali metal alkoxide.

It is of advantage to have a slight excess of aluminum in the starting mixture, i.e. the molar ratio of Al:M is about 1–1.3:1, since the reaction of the alkali metal hydroxide with the alcohol yielding alkali metal alkoxide is substantially faster than the reaction of aluminum trihydroxide with the already formed alkali metal alkoxide, forming the desired alkali metal aluminum alkoxide $MAl(OR)_4$; at an equimolar ratio reaction of the last portions of the aluminum trihydroxide would therefore not occur until after a long time so that unreacted alkali metal alkoxide might be found in the end product.

It has been found to be of advantage to pre-grind the aluminum trihydroxide either alone or already combined with the alkali metal hydroxide and to do so either in dry form or in alcoholic suspension.

The appropriate compounds of Na, K, Rb and Cs may be used as alkali metal hydroxide or alkali metal alkoxide; lithium hydroxide or alkoxide may be used but react only slowly. The alkyl radical of the alkoxide may be the same as that of the alcohol used in the reaction or may be that of any lower boiling alcohol so that it will be boiled off along with the water of reaction and excess alcohol used in the reaction, e.g. alkanols containing up to three carbon atoms.

The invention will be further described in the following illustrative examples wherein all parts are by weight unless otherwise expressed.

EXAMPLE 1

Potassium aluminate was made from a well blended mixture of potassium hydroxide and aluminum trihydroxide (molar ratio 1:1) by melting the same together at 220–240° C. and normal pressure for approximately 15 hours; analysis: K, 33.9%; Al, 24.0%. The resulting melt was allowed to solidify, and was then crushed and finely ground in a ball mill. In a multi-necked 1 liter flask provided with a stirrer and Soxhlet attachment, 35 g. of this melt were boiled with approximately 800 ml. of n-butanol under reflux conditions, with stirring. Alcohol was distilled off together with water formed in the reaction. The reaction water was bound to active zeolite 4 A. or silica gel in the Soxhlet, the alcohol being recycled. When the water content of the alcohol distilling off fell below 0.01%, the reaction was stopped, the reaction solution was siphoned off from insolubles and was concentrated to dryness in the vacuum.

Yield: 30 g. (26.9% of theory) of a white granular material.

Analysis.—Calc. (percent): K, 10.91; Al, 7.53; C, 53.60; H, 10.12. Found (percent): K, 10.9; Al, 7.52; C, 53.11; H, 10.18.

EXAMPLE 2

A well blended mixture of potassium hydroxide and aluminum trihydroxide (molar ratio 1:1) was melted in 15 hours at 150° C. and normal pressure in a stream of nitrogen; analysis: K, 35.4%; Al, 24.29%. The resulting melt was allowed to solidify, crushed and finely ground in a ball mill.

In a 1 liter multiple-necked flask provided with a stirrer, condenser and return line, 134 g. of the solidified melt were boiled in approximately 800 ml. of n-butanol under reflux conditions. The water-containing alcohol distilling off was conducted into a second flask after condensation where the reaction water was bound to burnt lime, the water-free alcohol being returned to the reaction flask via the return line. When the water content of the alcohol distilling-off was <0.01% the reaction solution was siphoned off from insolubles and concentrated to dryness in the vacuum.

Yield: 124 g. (28.46%) of a white granular material.

Analysis.—Calc. (percent): K, 10.91; Al, 7.53; C, 53.60; H, 10.12. Found (percent): K, 11.2; Al, 7.47; C, 53.60; H, 10.17.

EXAMPLE 3

A well blended mixture of potassium hydroxide and aluminum trihydroxide (molar ratio 1:1) was melted at 110° C. and normal pressure in a stream of nitrogen for 15 hours; analysis: K, 27.4%; Al, 20.28%. The resulting melt was solidified, crushed and finely ground in a ball mill.

In a 1 liter multiple-necked flask provided with a stirrer, condenser and return line, 134 g. of this solidified melt were boiled with approximately 800 ml. of n-butanol under reflux conditions. The alcohol distilling off and laden with water was condensed and conducted into a second flask where the reaction water was bound to activated zeolite 4 A. Substantially water-free alcohol was distilled from this flask and was returned after condensation to the reaction flask via the return line. At the end of the reaction when the water content in the alcohol distilling off was <0.01% the reaction solution was siphoned off from insolubles and concentrated to dryness in the vacuum.

Yield: 290 g. (75.55%) of a slightly yellow-brownish granular material.

Analysis.—Calc. (percent): K, 10.91; Al, 7.53; C, 53.60; H, 10.12. Found (percent): K, 11.1; Al, 7.08; C, 53.19; H, 10.20.

EXAMPLE 4

62.3 g. of 90% potassium hydroxide were dissolved in approximately 800 ml. of n-butanol and 78 g. of aluminum trihydroxide were added. The suspension was boiled under reflux conditions in a 1 liter multiple-necked flask provided with a stirrer, condenser and return line until the water content in the alcohol distilling off was <0.01%. The water-containing alcohol distilling off during the reaction was conducted into a second flask after condensation where the reaction water was bound to burnt lime. Substantially water-free alcohol was distilled off from this second flask and was returned, after condensation, to the reaction flask via the return line. At the end of the reaction the reaction solution was siphoned off from insolubles and concentrated to dryness in the vacuum.

Yield: 285 g. (72.47%) of a slightly brownish-yellow granular material.

Analysis.—Calc. (percent): K, 10.91; Al, 7.53; C, 53.60; H, 10.12. Found (percent): K, 11.1; Al, 6.86; C, 52.27; H, 10.2.

EXAMPLE 5

70.1 g. of potassium methoxide were dissolved in approximately 800 ml. of n-butanol and 78 g. of aluminum trihydroxide were added. The suspension was boiled under reflux conditions in a 1 liter multiple-necked flask provided with a stirrer, condenser and return line until the water content of the alcohol distilling off was <0.01%. During the reaction, the alcohol distilling off and laden with water was condensed and conducted into a second flask where the reaction water was bound to burnt lime. Alcohol was distilled off from this second flask, largely free from water, and was returned after condensation to the reaction flask via the return line. At the end of the reaction the reaction solution was siphoned off from insolubles and concentrated to dryness in the vacuum.

Yield: 280 g. (72.85%) of a yellowish-white granular material.

Analysis.—Calcd. (percent): K, 10.91; Al, 7.53; C, 53.60; H, 10.12. Found (percent): K, 10.9; Al, 7.02; C, 52.75; H, 10.5.

EXAMPLE 6

A mixture of 90% potassium hydroxide and aluminum hydroxide in the molar ratio 1:1.3 was ground in a ball mill for approximately 50 hours; the resulting fine powder analyzed: K, 23.8%; Al, 21.22%

(molar relation K:Al=1:1.292)

In a 1 liter multiple-necked flask provided with stirrer, condenser and return line, 163.7 g. of this mixture were boiled in approximately 800 ml. of anhydrous n-butanol under reflux conditions until the water content of the alcohol distilling off was <0.01%. During the reaction, alcohol laden with water was distilled off, condensed and conducted into a second flask where the reaction water was bound to burnt lime. Alcohol was distilled off from this second flask, largely free from water, and was returned after condensation to the reaction flask via the return line. At the end of the reaction the reaction solution was siphoned off from insolubles and concentrated to dryness in the vacuum.

Yield: 355 g. of a white granular material (75.11% of theory based on Al supplied, 96.05% of theory based on the potassium equivalent of Al supplied).

Analysis.—Calc. (percent): K, 10.91; Al, 7.53; C, 53.60; H, 10.12. Found (percent): K, 10.1; Al, 7.35; C, 54.4; H, 10.45.

EXAMPLE 7

A mixture of 90% potassium hydroxide and aluminum trihydroxide in the molar ratio 1:1.2 was ground in a ball mill for approximately 17 hours; the powder analyzed: K, 24.5%; Al, 21.22% (molar relation K:Al=1:1.255). In a 1 liter multiple-necked flask provided with stirrer and Soxhlet attachment, 39 g. of this mixture were boiled while agitating with approximately 800 ml. of anhydrous isobutanol, the alcohol being refluxed and the reaction being continued until the water content in the alcohol distilling off was <0.01%. The reaction water was bound to activated zeolite 4 A. Subsequently the reaction solution was siphoned off from insolubles and concentrated to dryness in the vacuum.

Yield: 81 g. of a brown, wax-like mass. (65.19% of theory based on Al supplied, 81.81% of the theory based on the potassium equivalent of Al supplied).

Analysis.—Calc. (percent): K, 10.91; Al, 7.53; C, 53.60; H, 10.12. Found (percent): K, 10.6; Al, 6.66; C, 50.46; H, 10.87.

EXAMPLE 8

A mixture of 90% potassium hydroxide and aluminum trihydroxide in the molar ratio of 1:1.2 were ground in a ball mill for approximately 17 hours; the powder analyzed: K, 24.5%; Al, 21.22%

(molar relation K:Al=1:1.225)

In a 1 liter multiple-necked flask provided with stirrer and Soxhlet attachment 39 g. of this mixture were boiled while stirring in approximately 800 ml. of anhydrous n-amyl alcohol, with reflux of the alcohol until the water content in the alcohol distilling off was <0.01%. The reaction water was bound to activated zeolite 4 A. Subsequently the reaction solution was siphoned off from insolubles and concentrated to dryness in the vacuum.

Yield: 97 g. of a yellowish, wax-like mass (73.48% of theory based on Al supplied, 92.23% of theory based on the potassium equivalent of Al supplied).

Analysis.—Calc. (percent): K, 9.43%; Al, 6.51; C, 57.93; H, 10.7. Found (percent): K, 9.20; Al, 6.27; C, 56.7; H, 10.6.

EXAMPLE 9

A mixture of 90% potassium hydroxide and aluminum trihydroxide in the molar ratio of 1:1.2 were ground in a ball mill for approximately 17 hours; the powder analyzed: K, 24.5%; Al, 21.22% (molar relation K:Al=1:1.255). In a 1 liter multiple-necked flask provided with stirrer and Soxhlet attachment, 39 g. of this mixture were boiled while agitating in approximately 800 ml. of anhydrous n-hexanol with reflux of the alcohol until the water content of the alcohol distilling off was <0.01%. The reaction water was bound to activated zeolite 4 A. Subsequently the reaction solution was siphoned off from insolubles and concentrated to dryness in the vacuum.

Yield: 103 g. of a yellowish, wax-like mass (64.97% of theory based on Al supplied, 81.55% of theory based on the potassium equivalent of Al supplied).

Analysis.—Calc. (percent): K, 8.31; Al, 5.73; C, 61.23; H, 11.13. Found (percent): K, 7.61; Al, 5.22; C, 59.2; H, 11.2.

EXAMPLE 10

In a 1 liter multiple-necked flask provided with stirrer, dropping funnel and distillation attachment, 27 g. of sodium methoxide were dissolved in approximately 1.2 liters of anhydrous n-butanol, and 78 g. of aluminum trihydroxide were then added (molar relation Na:Al=1:2). While continuously adding anhydrous n-butanol dropwise, the mixture was heated until the water content in the alcohol distilling off dropped to below 0.03% and approximately 1.5 moles of water had been withdrawn from the reaction mixture. Subsequently the reaction solution was siphoned off from insolubles and concentrated to dryness in the vacuum.

Yield: 164 g. of a brown-yellow tinged colorless granular material (47.4% of theory based on Al supplied, 94.8% of theory based on sodium equivalent of Al supplied).

Analysis.—Calc. (percent): Na, 6.71; Al, 7.88; C, 56.12; H, 10.6. Found (percent): Na, 6.83; Al, 7.80; C, 55.12; H, 10.98.

EXAMPLE 11

In a 1 liter multiple-necked flask provided with a stirrer and Soxhlet attachment, a mixture of 42.08 g. of potassium ethoxide and of 31.2 g. of 90% potassium hydroxide was dissolved in approximately 800 ml. of anhydrous n-butanol. The solution was boiled under reflux conditions and with stirring. Water formed in the reaction was distilled off together with the alcohols and was bound to active silica gel in the Soxhlet. When the water content of the alcohol distilling off fell below 0.01%, 93.6 g. of aluminum trihydroxide were added and the distillation was continued until again the water content of the alcohol distilling off fell below 0.01% (molar relation K:Al=1:1.20). At the end of the reaction the reaction solution was siphoned off from insolubles and concentrated to dryness in the vacuum.

Yield: 342.0 g. of yellowish-white granular material (78.06% of theory based on Al supplied, 93.68% of theory based on the potassium equivalent of Al supplied).

Analysis.—Calc. (percent): K, 10.91; Al, 7.53; C, 53.60; H, 10.12. Found (percent): K, 10.45; Al, 7.39; C, 54.02; H, 10.32.

EXAMPLE 12

In a 1 liter multiple-necked flask provided with a stirrer, condenser and return line, a mixture of 70 g. of a finely ground potassium aluminate, prepared according to the description in Example 3, 31.2 g. of 90% potassium hydroxide and 43.2 g. of aluminum trihydroxide (molar relation K:Al=1:1.09) were boiled with approximately 800 ml. of anhydrous n-butanol under reflux conditions. The alcohol distilling off and laden with water was condensed and conducted into a second flask where the reaction water was bound to burnt lime, the water-free alcohol being returned to the reaction flask via the return line. When the water content of the alcohol distilling off was <0.01% the reaction solution was siphoned off from insolubles and concentrated to dryness in the vacuum.

Yield: 302.5 g. of a yellowish granular material (79.83% of theory based on Al supplied, 87.00% of theory based on the potassium equivalent of Al supplied).

Analysis.—Calc. (percent): K, 10.91; Al, 7.53; C, 53.60; H, 10.12. Found (percent): K, 11.15; Al, 7.69; C, 53.43; H, 10.03.

EXAMPLE 13

In a 1 liter multiple-necked flask provided with a stirrer and Soxhlet attachment, a mixture of 70 g. of a finely ground potassium aluminate, prepared according to the description in Example 3, 35.09 g. of potassium methoxide and 43.2 g. of aluminum trihydroxide (molar relation K:Al=1:1.09) were boiled with approximately 800 ml. of anhydrous n-butanol under reflux conditions. The alcohol distilling off together with water formed in the reaction, was condensed and the reaction water was bound to active zeolite 4 A. in the Soxhlet, the alcohol being recycled. When the water content of the alcohol distilling off fell below 0.01%, the reaction was stopped, the reaction solution was siphoned off from insolubles and was concentrated to dryness in the vacuum.

Yield: 306 g. of a yellowish-white granular material (77.50% of theory based on Al supplied, 84.48% of theory based on the potassium eqivalent of Al Supplied).

Analysis.—Calc. (percent): K, 10.91; Al, 7.53; C, 53.60; H, 10.12. Found (percent): K, 10.67; Al, 7.38; C, 53.15.; H, 10.20.

It will be appreciated that the instant specification and examples are set forth by way of illustration and not limitation, and that various modifications and changes may be made without departing from the spirit and scope of the present invention.

What is claimed is:

1. The process for producing an alkali metal alkoxide of the formula $MAl(OR)_4$ wherein M is an alkali metal and R is selected from the group consisting of alkyl containing in excess of three carbon atoms, cycloalkyl and aralkyl, which comprises boiling an excess of an alcohol of the formula ROH with at least one member selected from the group consisting of (a) a mixture of an alkali metal hydroxide and aluminum trihydroxide, (b) a mixture of an alkali metal alkoxide and aluminum trihydroxide and (c) an alkali metal aluminate, and distilling off water formed in the reaction.

2. Process according to claim 1, wherein the alcohol is boiled with a mixture of two or three of the members (a), (b) and (c).

3. Process according to claim 1 wherein the water is distilled off with alcohol, the distillate is condensed, the water is removed from the condensate and the water-free alcohol in the condensate is recycled to the reaction.

4. Process according to claim 1, wherein the reaction mixture is boiled under reflux conditions and the water is removed from the runback by means of a water absorbing agent.

5. Process according to claim 4, wherein the water absorbing agent is a member selected from the group consisting of a zeolite, a molecular sieve, silicagel and burnt lime.

6. Process according to claim 1, wherein the reaction mixture is boiled under reflux conditions and the water is removed from the vapor phase by means of a water absorbing agent.

7. Process according to claim 1, wherein the organic solvent is part of an azeotropic ternary system, containing water and the alcohol and the water is removed by azeotropic distillation.

8. Process according to claim 7, wherein the organic solvent is a member selected from the group consisting of benzene, toluene and xylene.

9. Process according to claim 1, wherein the alcohol is boiled with alkali metal aluminate, which may contain a member selected from the group consisting of up to 2 molecules of chemical bonded water per mole of aluminate of the formula $MAlO_2$ and water at least in a quantity to form a concentrated solution of the aluminate.

10. Process according to claim 1, wherein the alkali metal aluminate is used as a dry powder.

11. Process according to claim 1, wherein the molar ratio of alkali metal to aluminum is about 1:1–1.3.

12. Process according to claim 1, wherein prior to boiling in alcohol one or more of the reactants is ground either dry or as a suspension in the alcohol.

13. Process according to claim 1, wherein the alkali metal comprises potassium or sodium and R is an alkanol of 4 to 7 carbon atoms.

References Cited

UNITED STATES PATENTS

| | | | |
|---|---|---|---|
| 3,060,216 | 10/1962 | Hamprecht et al. | 260—448 AD |
| 3,147,272 | 9/1964 | Brown et al. | 260—448 AD |
| 3,507,895 | 4/1970 | Casensky et al. | 260—448 AD |
| 3,629,288 | 12/1971 | Vit | 260—448 AD |
| 3,652,622 | 3/1972 | Vit et al. | 260—448 AD |

HELEN M. S. SNEED, Primary Examiner